(12) United States Patent
Haake

(10) Patent No.: US 6,253,011 B1
(45) Date of Patent: Jun. 26, 2001

(54) MICRO-ALIGNER FOR PRECISELY ALIGNING AN OPTICAL FIBER AND AN ASSOCIATED FABRICATION METHOD

(75) Inventor: John M. Haake, St. Charles, MO (US)

(73) Assignee: McDonnell Douglas Corporation, St. Louis, MO (US)

( * ) Notice: Subject to any disclaimer, the term of this patent is extended or adjusted under 35 U.S.C. 154(b) by 0 days.

(21) Appl. No.: 09/223,027

(22) Filed: Dec. 30, 1998

(51) Int. Cl.$^7$ ....................................................... G02B 6/26
(52) U.S. Cl. .................................. 385/52; 385/14; 385/88; 385/49
(58) Field of Search ................................ 385/14, 49, 52, 385/88, 89, 147, 50

(56) References Cited

U.S. PATENT DOCUMENTS

| | | | |
|---|---|---|---|
| 5,080,458 | 1/1992 | Hockaday | 385/14 |
| 5,359,687 | * 10/1994 | McFarland et al. | 385/49 |
| 5,375,033 | 12/1994 | MacDonald | 361/281 |
| 5,536,988 | 7/1996 | Zhang et al. | 310/309 |
| 5,553,183 | 9/1996 | Bechamps | 385/95 |
| 5,602,955 | 2/1997 | Haake | 385/136 |
| 5,606,635 | 2/1997 | Haake | 385/53 |
| 5,659,647 | * 8/1997 | Kravitz et al. | 385/52 |
| 5,692,086 | 11/1997 | Beranek et al. | 385/94 |
| 5,745,624 | 4/1998 | Chan et al. | 385/91 |
| 5,796,152 | 8/1998 | Carr et al. | 257/415 |
| 5,870,518 | 2/1999 | Haake et al. | 385/90 |
| 5,881,198 | 3/1999 | Haake | 385/136 |
| 5,926,594 | * 7/1999 | Song et al. | 385/49 |
| 5,940,558 | * 8/1999 | Bishop et al. | 385/52 |
| 5,955,817 | 9/1999 | Dhuler et al. | 310/307 |
| 5,962,949 | 10/1999 | Dhuler et al. | 310/307 |
| 5,994,816 | 11/1999 | Dhuler et al. | 310/307 |
| 6,023,121 | 2/2000 | Dhuler et al. | 310/307 |
| 6,049,650 | * 4/2000 | Jerman et al. | 385/137 |
| 6,064,781 | * 5/2000 | Seibold et al. | 385/14 |
| 6,118,917 | * 9/2000 | Lee et al. | 385/49 |

OTHER PUBLICATIONS

Dhuler, V. et al., "Microsystems for Three Axis Active Fiber Alignment", paper presented at Solid–State Sensor and Actuator Workshop, Hilton Head Island, South Carolina, Jun. 8–11, 1998, pp. 277–280.

"MEMS Active Fiber Microactuator", Semiconductor International, Dec. 1997, p. 32.

* cited by examiner

*Primary Examiner*—Brian Healy
(74) *Attorney, Agent, or Firm*—Westerlund & Powell, P.C.

(57) ABSTRACT

A micro-aligner for precisely aligning an optical fiber with an optical device, and methods of making and using same. The micro-aligner includes a carrier having a surface plane and holds an optical fiber to be positioned in alignment with an optical device. Spring biased first and second microactuators are provided on the carrier for effecting in-plane movement and alignment of the optical fiber with an optical device in either or both of two orthogonal in-plane directions when either or both of said in-plane microactuators is activated. Backstops are located on the carrier in respective association with each of the first and second microactuators, respectively, such that the first and second backstops delimit the amount of return in-plane movement of the respective beam after either of the respective first or second microactuator is de-activated. A third microactuator also is provided on the carrier which, when activated, effectively deflects the carrier upward in a direction away from the base.

11 Claims, 4 Drawing Sheets

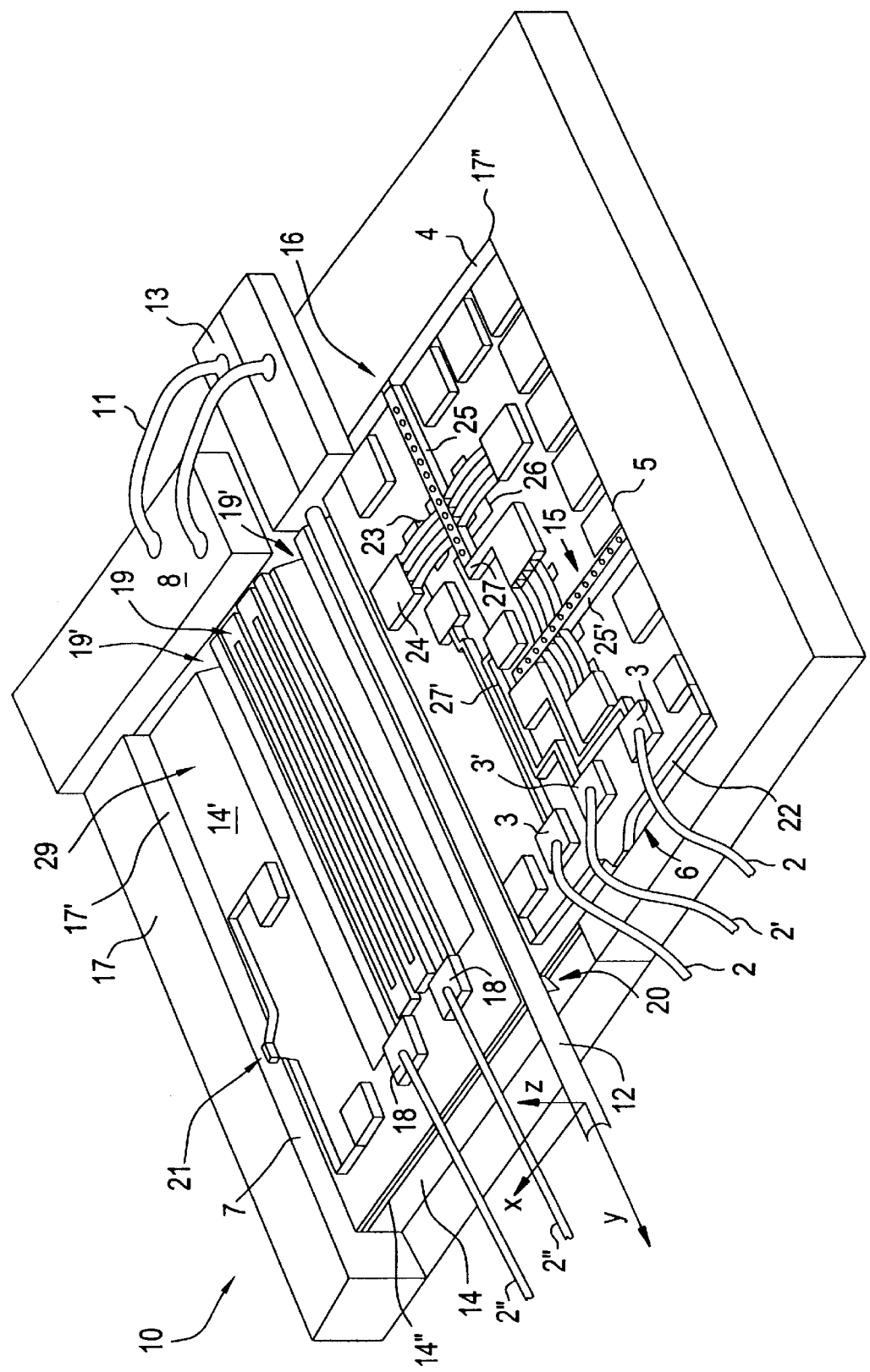

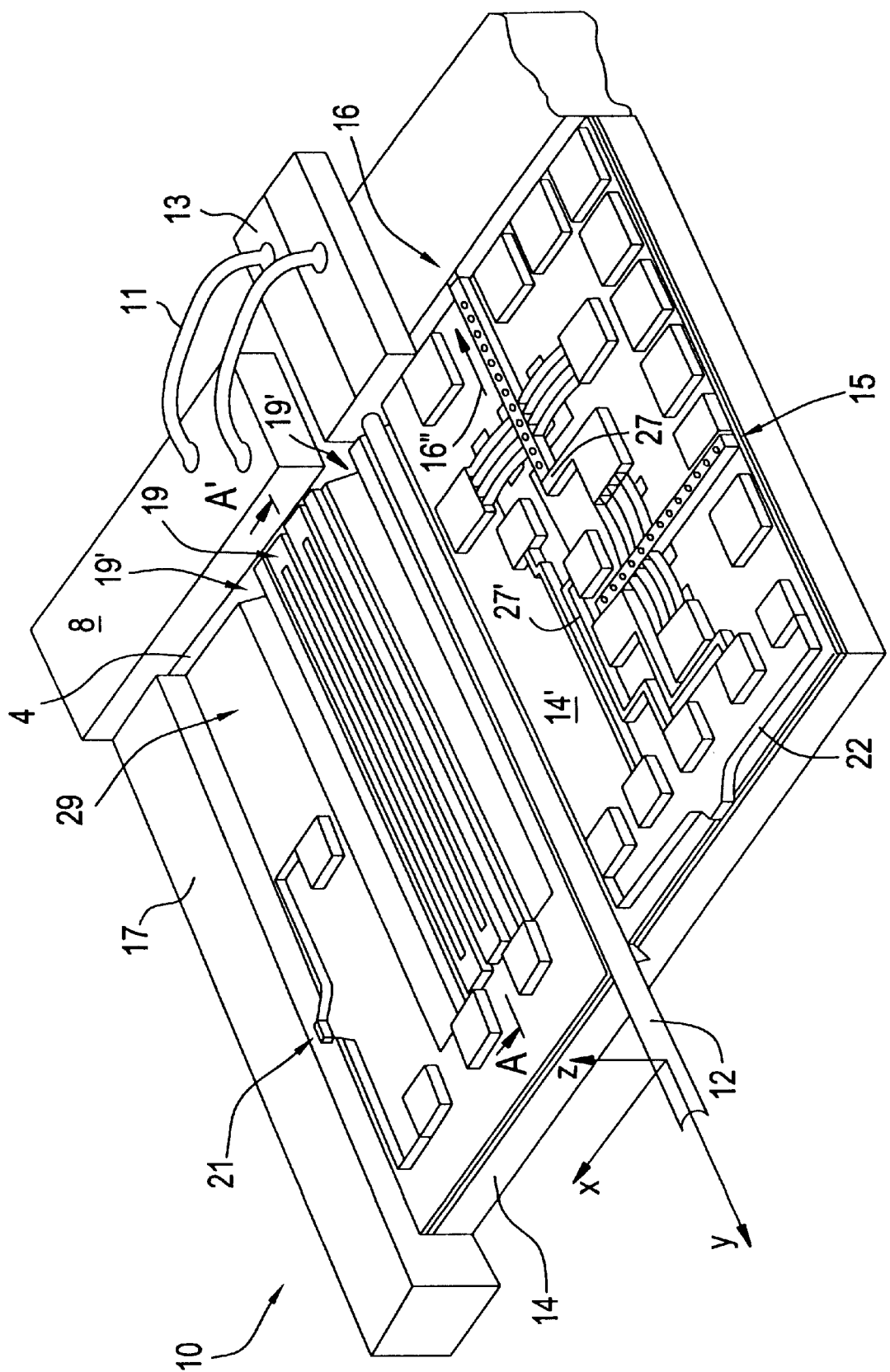

MICRO-ALIGNER FOR PRECISELY ALIGNING AN OPTICAL FIBER AND AN ASSOCIATED FABRICATION METHOD

GOVERNMENT RIGHTS

This invention was made under U.S. Army Research Office government contract no. DAAH04-95-C-0007. The government may have certain rights to this invention.

FIELD OF THE INVENTION

The present invention relates generally to systems and methods for controllably positioning an optical fiber and, more particularly, to a micro-aligner for precisely aligning an optical fiber with an optical device and an associated method of fabricating such a micro-aligner.

BACKGROUND OF THE INVENTION

Single mode optical fibers are expected to bring rapid advancements in a wide array of photonic applications, providing the high bandwidth that supports applications such as video links, fiber laser and fiber amplifier systems, and direct-write laser printing. The construction of single mode fibers eliminates intermodal dispersion and thereby affords extremely large bandwidths compared with multi-mode fibers. Tapping the potential of single mode fibers presents a significant challenge due to the extremely small aperture (8 µm typically) making fiber-to-fiber and fiber-to-photonic device connections an exacting and expensive process. Attaining useful coupling efficiencies requires that the fiber be aligned with submicron accuracy and be fixed in place through the life of the device. This coupling process is even more demanding with lensed single mode fibers and Polarization-Maintaining (PM) fibers.

Significant challenges, both technical and economic, have to be surmounted in order for photonic devices using single mode fibers to become widely adopted, chief among them being the fiber alignment issue. Also, broader application of PM fibers in quantum well lasers, traveling wave amplifiers, switches, and other devices has been impeded by the alignment problem. For purposes of this application, the terminology "fiber optic", whether in its singular or plural form, will be understood to refer to single mode fibers.

For instance, the development of higher volume, lower cost opto-electronic manufacturing technologies has been desirable in order to accelerate the installation of opto-electronics in lower speed and shorter distance networks. These networks include important technologies such as telecommunications, and computer and video applications for both commercial and defense systems. Opto-electronics is a hybrid technology based on the integration of laser diodes, silicon detectors and integrated circuits, and GaAs high frequency circuits, and so forth, which currently are coupled to the external environment via silica fiber optics.

Proper alignment of the optical fibers is necessary in order to maximize the percentage of light coupled from the light source or electro-optic device to the optical fiber and to thereby increase the transmission efficiency of the optical signals. However, the alignment of optical fibers is complicated by the relatively small sizes of both the optical fiber waveguide, such as a single mode optical fiber which, for example, can have a light transmitting core diameter of approximately 2–10 micrometers, and the light source which has approximately the same emitting area size.

Furthermore, it is even more complicated to precisely align an optical fiber within a hermetically sealed package in which opto-electronic devices are typically disposed. As known in the art, in addition to precisely aligning the optical fiber in each of the six degrees of freedom, the alignment process must typically be performed without physically straining or otherwise heating the optical fiber and mount since heat can cause the optical fiber to move due to thermal expansion, thereby misaligning the optical fiber. Also, the heat required to allow one optical fiber to be positioned and affixed can oftentimes affect the position or alignment of adjacent optical fibers thereby misaligning the adjacent optical fibers and thus making multiple single mode fiber alignment and coupling extremely difficult. In addition, access to an optical fiber within a hermetically sealed package is generally limited since the optical device with which the optical fiber is being aligned is disposed within an internal cavity defined within the hermetic package, and typically drives the choice of a hermetic package that is larger than needed.

As a consequence of the above-mentioned difficulties in precisely aligning optical fibers, a need has persisted for a reliable, cost effective and easily implemented single mode fiberoptic alignment and bonding to discrete opto-electronic devices. Namely, the laser diode to fiber coupling has been the weakest link in the opto-electronic hybrid manufacturing process. As a consequence, the packaging of individual single mode opto-electronic components has been dominated by the fiber alignment issue, and which has represented in excess of 40–50% of the product cost. Additionally, the potential for development of revolutionary photonic technologies based on fiber optic interconnections has remained largely untapped because of the fiber alignment problem.

U.S. Pat. No. 5,602,955, the entire disclosure of which is incorporated herein by reference, describes various methods and apparatus known in the art for aligning an optical fiber as well as the shortcomings associated with those methods and apparatus. Contemporary procedures for aligning fiber optics and microptics have been very labor intensive and required considerable capital investment.

In general, prior optical fiber alignment approaches fall under either of two basic categories, viz., active and passive alignment techniques. Passive alignment relies on precision fixturing of the fiber relative to the coupled device. For instance, a known passive fiber alignment scheme employs a micromachined V-groove in a silicon substrate for precision placement of the fiber followed by bonding. The silicon micromachining permits very precise definition of the V-groove with respect to the fiber dimensions and to the silicon surface. Silicon V-grooves have been coupled with precision placement of solder bumps and surface tension alignment to provide one-dimensional fixturing and alignment of fibers.

Although the passive alignment approach is potentially more cost-effective than active alignment, prior systems have not yet achieved the manufacturable tolerances required by single mode fiberoptic alignment. Namely, prior published efforts on use of passive alignment for optical fiber alignments have reported laser diode to optical fiber transverse and lateral misalignments of approximately 2.8 microns for single mode fiber coupling, which are not suitable for single mode packaging. E.g., see J. Sutherland et al., *Optical Coupling and Alignment Tolerances in Optoelectronic Array Interface Assemblies,* 1995 IEEE Electronic Components and Technology Conference, and Sutherland et al., *Alignment Tolerance Measurement and Optical Coupling Modeling for Optoelectronic Array Interface Assemblies,* 1996 IEEE Electronic Components and Technology Conference.

In active alignment, the powered (e.g., light-emitting) operator or machine manipulates the fiber relative to the coupled active device and seeks active feedback, such as the output from a photodiode, to optimize the alignment. Once optimized, the fiber is affixed in place using laser welding, adhesives or eutectic bonding. Commercial alignment systems have been developed to automatically connect, or pigtail, an opto-electronic device, such as a laser diode, to an optical fiber. For instance, the known Melles Griot and Newport alignment system has been developed to precisely align optical fibers with other optical components. These automated active alignment systems are very expensive to implement because they have the drawback of being package-specific and device-specific and, therefore, require retooling for each application. Such prior automated active alignment systems represent a large capital outlay that hindered product development at the startup, university, or experimenter level, or they were incompatible with the goal of providing versatile, high volume manufacturing due to the fact that it represents a choke point. Consequently, the task of fiber alignment is predominantly a manual operation at companies with low capitalization, in which an operator must work through a microscope with precision stages to manipulate and bond each fiber.

In an effort to address these issues, active fiber micro-aligners (AFMAs) have been developed to permit an optical fiber to be aligned with an electro-optic device, such as a laser diode or even another optical fiber. At the heart of AFMA technology are microelectromechanical systems (MEMS) devices, which are micromachined silicon chips, that possess both mechanical and electronic functionality.

U.S. Pat. No. 5,602,955 shows a microactuator which controllably positions an optical fiber without the need for heating during alignment thereby preventing misalignment of adjacent optical fibers. The microactuator of U.S. Pat. No. 5,602,955 is bimorphic in nature, and it precisely aligns an optical fiber within a hermetically sealed package, such as a standard 14-pin hermetic butterfly package, in which opto-electronic devices are typically disposed. While the microactuator of U.S. Pat. No. 5,602,955 provides a significant improvement over previous AFMA technologies, further improvements are nonetheless desired to reduce costs of opto-electronic hybrid manufacturing processing and to open-up opportunities in all-optical photonics applications.

SUMMARY OF THE INVENTION

The invention meets the above needs and overcomes the deficiencies of the prior art by providing an improved active fiber micro-aligner (AFMA) device and a method for precisely aligning an optical fiber with an optical device using such an AFMA device.

In one embodiment of this invention, there is an active fiber micro-aligner for precisely aligning an optical fiber with an optical device which includes a carrier having an optical fiber holding means for receiving the optical fiber, in which the optical fiber, as held on the carrier, is independently movable in any of three orthogonal directions relative to the optical device. To accomplish this, the carrier is provided with first and second in-plane microactuators for inducing in-plane movement of the carrier and held optical fiber in respective first and second orthogonal directions along the surface plane of the carrier, and a third microactuator for inducing out-of-plane movement of the carrier and held optical fiber in a third direction that is orthogonal to said first and second orthogonal directions. Backstops are provided on the carrier to limit the return movement of the in-plane microactuators. The carrier is positioned within a recess of a stationary alignment housing as defined by a base and upright sidewalls. The carrier includes first and second biasing means biased against sidewalls of the stationary alignment housing to thereby impose counter forces against which the respective first and second in-plane microactuators on the carrier must act and overcome (as well as the bending force of the optical fiber, the stiction/friction associated with moving the carrier across the surface of the base, the forces associated with the wire bonds and all other forces typically encountered in aligning and bonding optical fibers) to induce in-plane movement of the carrier relative to the optical device.

When the first and second (in-plane) microactuators are at rest, the counterforce biasing means establish an equilibrium in-plane reference position of the unitary movable carrier in a corner of alignment housing. This three axes active fiber micro-aligner enables the precise alignment of an optical fiber with an optical device, such as a laser diode or another optical fiber, located off the carrier.

In one preferred embodiment of this invention, the aforesaid active fiber micro-aligner includes first and second thermally actuated arch beam actuators for effecting the in-plane alignment in the orthogonal in-plane (x-and y-axes) directions of an optical fiber held by the micro-aligner, and a bimorphic actuator for effecting out-of-plane (z-axis) alignment of the optical fiber held by the micro-aligner.

In one preferred embodiment, each thermally actuated arch beam microactuator preferably has a cantilever beam with a distal end for engaging a portion of a sidewall of the alignment housing when the microactuator is activated. When either thermally actuated arch beam actuator is activated, the beam moves relative to the carrier surface to which it is attached, and specifically, it moves along one of the orthogonal in-plane directions into contact with a sidewall of the alignment housing as a bearing surface effective to transfer the force of the moving beam to the alignment housing, which, in turn, causes a counterforce to be created that tends to push the carrier away from the sidewall of the alignment housing in the opposite direction. The amount of in-plane movement induced upon the carrier in this manner by each in-plane microactuator is itself limited by a counterforce created by a respective biasing spring provided on the opposite side of the carrier that is biased against the opposite facing sidewall of the alignment housing structure. First and second backstops are also located on the carrier adjacent the opposite end of each respective beam in respective association with each of the first and second microactuators, where the first and second backstops serve to delimit the amount of return in-plane movement of the respective beam after either of the respective first or second microactuator is de-activated, which prevents buckling of the microactuator when the beam returns. To induce out-of-plane positioning alignment of the optical fiber with the optical device in a third direction that is orthogonal to the aforesaid two in-plane directions, the third microactuator provided on the carrier effectively deflects the carrier and held optical fiber upward in a direction away from the base or support surface upon which the carrier rests.

The out-of-plane microactuator preferably is a bimorphic actuator formed on the carrier that, when activated, controllably deflects the carrier independent of the thermally actuated arch beam actuators. The bimorphic actuator preferably is comprised of two superposed layers that have different coefficients of thermal expansion that are controllaby exposed to thermal stimulation via an intervening thin film resistive heater during activation of the out-of-plane microactuator.

This combination of in-plane thermally actuated arch beam actuators with an out-of-plane bimorphic microactuator as formed on a common carrier substrate permits the achievement of large forces and displacements through three possible axes of motion effective to overcome not only the biasing means, such as counterforce springs, but also the fiber optic, friction, and wirebond constraints to perform precise in-package alignment of an optical fiber with another optical device.

In yet another embodiment of this invention, there is a method of using the aforesaid active fiber micro-aligner of the invention for precisely aligning an optical fiber with an optical device.

Among other important advantages, the inventive active fiber micro-aligner liberates an opto-electronic engineer from the costs and constraints associated with the packaging of photonic circuits, and permits the use of maximum performance devices.

The present invention will now be described more fully hereinafter with reference to the accompanying drawings, in which a preferred embodiment of the invention is shown. Like numbers refer to like elements throughout.

BRIEF DESCRIPTION OF THE DRAWINGS

FIG. 1A is a perspective view of a micro-aligner according to a preferred embodiment of the invention for aligning a fiber optic to a laser diode.

FIG. 1B is another perspective view of the micro-aligner according to FIG. 1A showing including a cut-away of a portion of the alignment housing structure thereof.

Corresponding reference characters indicate corresponding parts throughout the drawings.

DETAILED DESCRIPTION OF THE PREFERRED EMBODIMENTS

Figure 2:
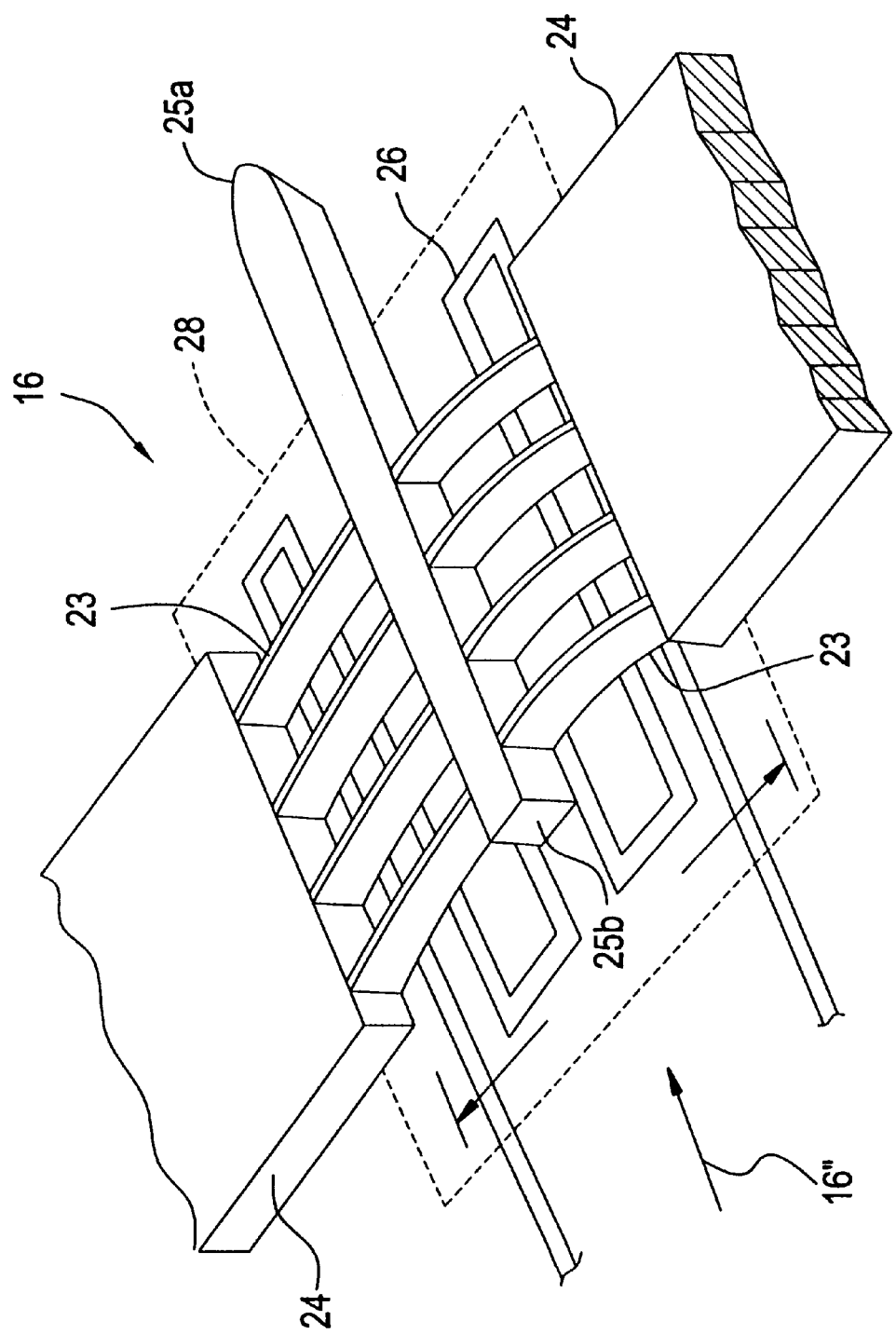
FIG. 2 is a perspective view of a thermal arch beam actuator used as the in-plane (x axis) actuator in the micro-actuator of FIG. 1A.

Referring now to FIG. 1A, a micro-aligner device 10 is generally shown embodying aspects of the invention. In the illustrated embodiment, the micro-aligner 10 controllably positions an optical fiber 12 to precisely align it with an associated optical device, viz., a laser diode 13 or another optical fiber. For example, the optical fiber 12 may be a single mode, multi-mode or polarization preserving optical fiber, although micro-aligner 10 is particularly well suited for precisely aligning single mode optical fibers. In addition, optical fiber 12 may have a lensed facet or a cleaved end facet without deviating from the scope of the invention. Laser diode 13 is illustrated in FIG. 1A as electrically connected to conductor line 8 via wire bond 11. As shown in FIG. 1A, micro-aligner 10 has a carrier substrate 14 upon which its various components are fabricated. The single mode optical fiber 12 is precisely attached in an optical groove 20 formed in carrier 14. The carrier substrate is a unitary body, and it rests on a base 9 of an alignment housing 17.

The alignment housing 17 is a frame-like body disposed in fixed relation to optical device 13. For example, the alignment housing 17 includes sidewalls 17' upstanding from base 9 along four sides with openings provided in the sidewalls on two opposing sides of the alignment housing 17 to accommodate positioning of the laser diode 13 and the portion of the optical fiber 12 off the carrier 14. The size of the recess formed by the sidewalls 17' is selected to slightly exceed the dimensions of the carrier 14 while being close enough to permit spring biasing to be created between the sidewalls of the alignment support structure and the carrier, as will be described in greater detail below. In a preferred embodiment, the alignment housing will include four upright sidewalls 4, 5, 6, and 7 arranged on base 9 such that a pair of parallel sidewalls is provided normal to each of the x-direction (i.e., walls 5, 7) and the y-direction (i.e., walls 4, 6) that together with base 9 define a recess 29 therein that will receive carrier 14 for reasons that will become apparent from the following descriptions.

The alignment housing 17 is preferably formed of a thermally conductive material to serve as a heat sink for drawing heat from optical device 13. In addition, the alignment support structure can also draw heat from the underside of the carrier 14. By drawing heat from the optical device and/or carrier, the carrier and, in turn, the optical fiber 12 can be maintained at a predetermined constant temperature such that the alignment of the optical fiber is not altered or otherwise affected due to temperature fluctuations. In one exemplary embodiment, the alignment support structure is comprised of a metallic material, such as copper or nickel. The alignment support structure can be a micromachined cavity or box formed by a variety of processes, such as by LIGA processing methods for making alignment structures, such as those described in U.S. Pat. No. 5,602,955, which teachings are incorporated herein by reference. In this way, the alignment housing 17 has the sidewalls 17' and base 9 formed as an integral body.

The carrier 14 sits on the base 9 of the alignment housing structure 17 by virtue of gravity and springs 21, 22 which act to hold it in recess 29, and it is not bonded or otherwise attached thereto. Thus, carrier 14 is freely slidable over base 9 once any inter-frictional forces therebetween are overcome. Preferably, substrate 14 comprises a layer of polished silicon; although, other semiconductor materials that can be micromachined are also usable. The side length dimensions and thickness of carrier 14 can be relatively small, e.g., the side dimensions each can be less than or equal to 5 mm and thickness can be about 0.5 mm.

It is to be understood that groove 20 can be formed by a variety of processes, such as etching, and may have a variety of other cross-sectional shapes without deviating from the scope of the invention. For instance, channel 20 can be a groove having a v-shaped cross section with opposing side walls defining an angle of approximately 55° with respect to the top surface 14' of substrate 14, such as an optical fiber-holding groove of the type described in U.S. Pat. No. 5,602,955, which teachings are incorporated herein by reference. For a bulk silicon wafer carrier, this type of groove can be formed by an anisotropic wet etch of the wafer surface with potassium hydroxide, or anisotropic plasma etch, and the like, according to techniques well known in the semiconductor processing arts, such as by anisotropic etching in the carrier substrate 14 in two different directions or orientations, such as <110> and <100>. A groove also can be formed by laser cutting of the wafer surface. Preferably, the V-shaped groove would be deep enough so that optical fiber is initially slightly below (e.g., approximately 5 μm below) its final aligned position.

Alternatively, in lieu of groove 20, an LIGA channel can be defined in its body for receiving and holding the optical fiber 12 in a fixed relation thereto. An optical fiber bonding agent or solder, for example, could be used to secure optical fiber 12 within an LIGA channel to maintain it in a fixed position relative to carrier 14. For example, an optical fiber bonding agent, such as Gould GlasSolder™ bonding agent, or a high temperature fluxless solder, such as gold/tin eutectic alloy solder, can be used to bond optical fiber 12 to carrier substrate 14. As known to those skilled in the art, optical fiber 12 is preferably metallized with titanium, platinum and gold, for example, which improves the bond within an LIGA channel. Whether holding means 20 is a groove or LIGA channel, carrier substrate 14 constitutes a carrier for holding optical fiber 12 in a fixed relation thereto.

The aforesaid active fiber micro-aligner 10 includes first and second in-plane actuators 15 and 16 for effecting the in-plane alignment in the orthogonal in-plane (x-and y-axes) directions of the optical fiber 12 held by the micro-aligner 10, while a third actuator 19 is used for effecting the out-of-plane (z-axis) alignment of the optical fiber 12 held by the micro-aligner 10. The preferred constructions of the in-plane and out-of-plane microactuators are described in greater detail below.

Referring to FIG. 1A, in order to induce in-plane alignment of optical fiber 12 as held on carrier 14 with a laser diode 13, the micro-aligner 10 includes two orthogonally positioned in-plane actuators, including x-direction actuator 15 and y-direction actuator 16, respectively, which are adapted to move carrier 14 relative to stationary alignment housing 17 and laser diode 13 in respective planar orthogonal x- and y-directions respectively, extending in a plane defined by the surface 14' of substrate 14. In turn, this permits optical fiber 12 to be precisely aligned with an associated optical device 13, e.g., a laser diode, in the in-plane directions.

In one embodiment, x-direction actuator 15 and y-direction actuator 16 are thermally actuated arch beam actuators. More specifically, and still referring to FIG. 1A, when such a thermally actuated arch beam actuator 16 is activated, its beam 25 moves relative to the stationary alignment housing 17 and its sidewalls 17' and base 9. Beam 25 moves along an orthogonal in-plane direction 16" (see FIG. 2), which is opposite to the y-direction indicated in FIG. 1A, until beam 25 comes into contact with the immediately confronting stationary sidewall 4 among sidewalls 17' of alignment housing 17 and creates an opposing force pushing the carrier 14 away from the sidewall 4 in the y-direction. The other in-plane thermally actuated arch beam microactuator 15 interacts in a similar manner via its beam 25' with another sidewall 5 among sidewalls 17' of the alignment housing 17 to push carrier 14 in an x-direction that is orthogonal to the y-direction.

The counterforce return springs 21 and 22 provide counter biasing forces that the x-direction actuator 15 and y-direction actuator 16 must act against and ultimately overcome, respectively, when activated to impart in-plane movement to carrier 14. Counter force spring 22 is shown in more detail in FIG. 1B, which cuts away a portion of the alignment housing sidewalls 17' for sake of illustration only. The counterforce springs 21 and 22 are biased against respective stationary walls 6 and 7 of alignment housing 17 to create respective biasing forces pushing the carrier 14 back into reference corner 17" of alignment housing 17 when the in-plane actuators 15 and 16 are both de-activated, and the carrier 14 is held in place as wedged into corner 17" as the equilibrium condition of the micro-aligner 10 until either or both of the in-plane actuators 15 and/or 16 are again activated. More specifically, when either or both are actuated, arch beam actuators 15 and 16 overcome the counter bias force provided by springs 21 and 22, respectively, as well as the frictional forces between carrier 14 and the alignment housing base 9, the bending moment of fiber 12, and the bending moments of the leads 2 connected to pads 3, to move carrier 14 in the desired in-plane direction.

As illustrated in more detail in FIG. 2 with respect to the y-direction thermally actuated arch beam actuator 16, and as equally applicable to x-direction thermally actuated arch beam actuator 15, the thermally actuated arch beam actuator 16 generally includes a plurality of arches 23 supported between a pair of side support structures or pads 24 and suspended over diaphragm 28 formed in the underlying surface 14' of substrate 14 by undercut etching of the substrate 14. Advantageously, such actuators 16 (and 15) are comprised of a single material so that they are less expensive and less complicated to fabricate than, for example, bimorphic actuators made from two materials. Although FIG. 2 illustrates actuator 16 as having four arches 23, the number of arches 23 may vary (e.g., 2–20). A preferred actuator suitable for use in the present invention for each of in-plane thermally actuated arch beam actuators 15 and 16, and which is fully described herein, is set forth in U.S. patent application Ser. No. 08/719,711, filed Sep. 27, 1996, the entire disclosure of which is incorporated herein by reference. A cantilever beam 25 extends across the arches 23. The cantilever beam 25a has a rounded distal end 25" oriented towards the alignment housing sidewall 4 (or 5).

When heated by a heater 26, thermal expansion causes the arches 23 to bend in a direction determined by their orientation, namely, in the direction 16" indicated in FIG. 2 (and FIG. 1B). As a result of the bending of arches 23, beam 25 moves along direction 16" towards and ultimately against sidewall 4 of the alignment housing 17 (see FIG. 1A). In a preferred embodiment, a polysilicon resistive heater positioned, or located, in close proximity to each actuator 15 or 16 (i.e., directly below the arches 23) embodies the heater 26. Thus, heater 26 provides heat to arches 23 when electrically stimulated for urging beam 25 towards and ultimately against bearing surface 4.

As a result, each beam 25, 25' of the respective thermally actuated arch beam actuators 16, 15, respectively, can be electronically controlled to independently apply a positive force to the carrier 14 effective to overcome the opposite biasing force of the associated retainer springs 21, 22, respectively, causing the carrier 14 to move in the opposite direction to the direction of force being applied by either beam 25, 25' against a sidewalls 4, 5 of the alignment housing 17. This allows for controlled positioning of the carrier 14 relative to the optical device 13 (and the alignment housing base 9) in an in-plane direction. The top surface of base 9 and the bottom surface of carrier 14 are preferably polished which reduces friction between the two features. Alternatively, the bottom surface of movable carrier 14 is coated with TEFLON® in order to reduce frictional forces between the top surface of a base 9 and the bottom surface of carrier 14.

In general, the direction of arches 23 determines the direction in which actuator 16 (or 15) bends, or deflects, and the amount of this movement is a function of the current supplied to polysilicon resistive heater 26. Thus, controlling the current supplied to heater 26 controls the deflection of actuator 16 and, consequently, controls the position of carrier 14 relative to optical device 13. Accordingly, in-plane microactuators 15 and 16 controllably position carrier 14 relative to laser diode 13 to precisely align the optical fiber 12 in groove 20 (or as bonded to an LIGA channel 20) with the associated optical device 13 in the respective x- and y-directions.

As illustrated in FIG. 1A, micro-aligner 10 has connections or leads 2 to a current supply (not shown) which supplies current to the polysilicon heaters 26 to resistively heat the respective arch beam actuators 15, 16. Return lead 2' is connected to bonding bad 3'. In one embodiment, the leads 2 can extend to respective pins of a hermetically sealed package, such as described in U.S. Pat. No. 5,602,955, which teachings are incorporated herein by reference. In order to facilitate this electrical stimulation of heaters 26, bonding pads 3 and 3', preferably thin films of a conductive material (e.g., gold), are formed on opposite end portions of the resistive element of each heater 26 for connection to the leads 2 from the current supply. Preferably, the heaters 26 can comprise a resistive element having a serpentine-pattern beneath the arches 23 of each in-plane microactuator 16 (and 15), which heats when energized with current. A cavity is provided by etching the underside of carrier 14 below a portion of each in-plane actuator 15 and 16 to form diaphragm 28 (see FIG. 2) to help thermally isolate heaters 26 from the rest of micro-aligner 10.

As shown in FIG. 1A, for example, backstops 27 and 27' are located on carrier 14 behind both the opposite distal ends (25a, 25b; FIG. 2) of beam 25 and beam 25', respectively, to delimit the amount of return movement of respective beams after distension prevent the arches from buckling when the beam returns.

In another embodiment of this invention, the x-direction actuator 15 and y-direction actuator 16 can be bimorphic actuators, such as the type described in U.S. Pat. No. 5,602,955, which teachings are incorporated herein by reference.

To induce out-of-plane positioning alignment of the optical fiber 12 with the optical device 13 in a third direction, i.e., the z-axis direction indicated in FIG. 1A, that is orthogonal to the aforesaid two in-plane (x, y) directions, a third microactuator 19 is provided on the carrier 14 which, when activated, effectively deflects the carrier 14 upward in a normal direction away from the direction of the alignment housing base 9. This three axes active fiber micro-aligner 10 enables the precise alignment of an optical fiber with an optical device, such as a laser diode or another optical fiber, located off but immediately adjacent the carrier 14.

Preferably, the z-direction actuator 19 is a bimorphic-type actuator formed on the carrier 14. Advantageously, the bimorphic actuator 19 is adapted to controllably position carrier 14 in the z-direction relative to the base 9 of the alignment housing 17 and the optical device 13. In general, layers of two materials which respond differently to thermal stimulation embody bimorphic actuator 19. In general, a resistive heater is sandwiched between the two layers to controllably introduce the thermal stimulation.

Figure 3A:
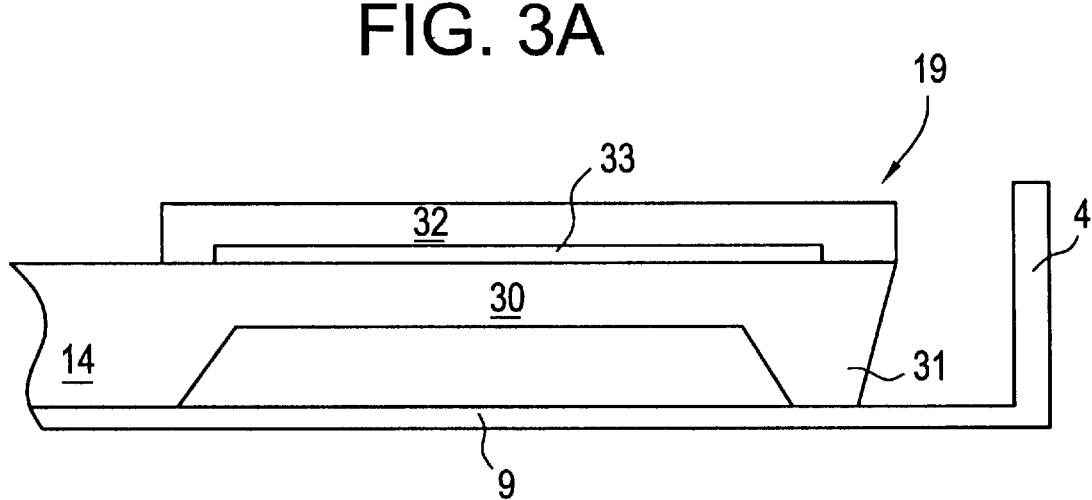
FIG. 3A is a cross section of the z-axis bimorphic micro-actuator taken along line A—A' of FIG. 1B when the z-axis actuator is at rest.

For example, FIG. 3A shows the z-axis actuator 19 when at rest. The z-axis actuator 19 includes a diaphragm structure 30 having a distal end 31 and the diaphragm structure is formed by undercut etching a portion of the silicon substrate 14, as defined between two parallel relief channels 19' (see FIG. 1A) formed through carrier substrate 14. Distal end 31 of z-axis actuator 19 is adjacent yet spaced from sidewall 4 of alignment housing 17. The processing used to form cantilever-like structures in the surface of a silicon substrate by anisotropic wet etching is known to those skilled in the art. The bimorphic actuator 19 includes two layers of materials which have different coefficients of thermal expansion, such as a layer of nickel 32 (or copper) disposed on silicon, and the metal layer has a larger coefficient of thermal expansion than silicon. The thin film resistive heater 33 is formed on the silicon substrate 14 in the desired pattern by similar techniques as described elsewhere herein relative to resistive heaters 26 used for the in-plane microactuators 15 and 16.

In order to facilitate electrical stimulation of the bimorphic actuators, bonding pads 18 (FIG. 1A), typically comprised of a conductive material, such as gold, can be formed on opposed end portions of the bimorphic actuator 19 such that an electrical current can be established therebetween via leads 2" connected to a power supply (not shown). Then, referring again to FIG. 3A, the metallic layer 32 can be deposited on the silicon 14 and thin film heater 33 by a variety of methods, including preferential sputtering, directed evaporation, and electroplating, with departing from the spirit and scope of the present invention.

Figure 3B:
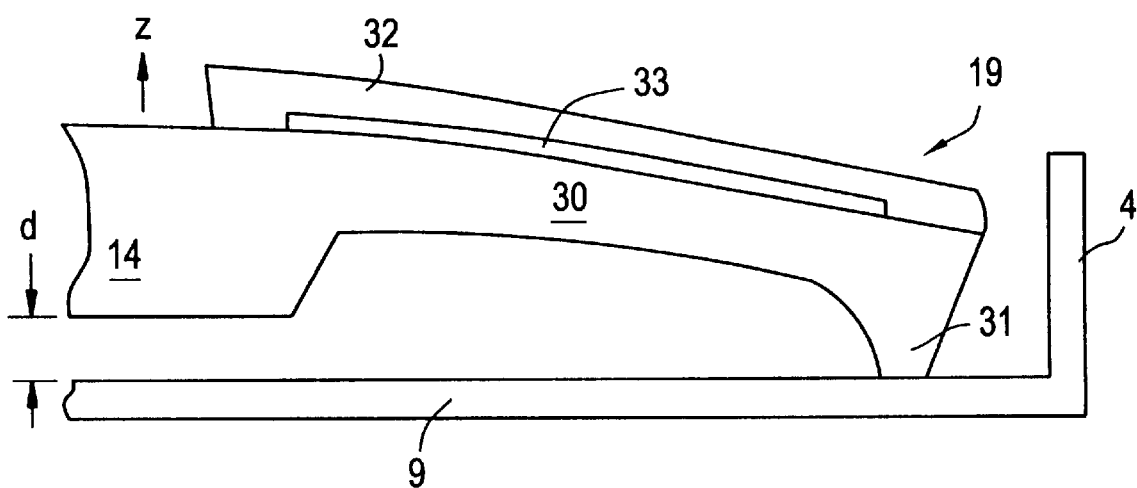
FIG. 3B is a cross section of the z-axis bimorphic micro-actuator taken along line A—A' of FIG. 1B when the z-axis actuator is activated.

FIG. 3B is a cross section of the z-axis microactuator of z-axis actuator taken along lone A—A' of FIG. 1B when the z-axis actuator is activated by inducing thermal stimulation through resistive heater 33. Upon heating via thin film resistive heater 33, the distal end 31 of the diaphragm 30 is caused to deflect downward, which, in turn, creates a counterforce pushing upward the carrier 14 (via diaphragm 30) a displacement distance 'd' in the z-direction which effectively displaces the optic fiber 12 positioned thereon in the z-direction. In this embodiment, the micro-aligner 10 includes current supply means for providing current to the resistive heater 33 of bimorphic actuator 19. In one embodiment, this can be accomplished by leads 2" extending to respective pins of a hermetically sealed package, such as described in U.S. Pat. No. 5,602,955, which teachings are incorporated herein by reference.

In this embodiment, the amount of the deflection of bimorphic actuator 19 is proportional to the magnitude of the electrical stimulation. By therefore controlling the current supplied to the bimorphic actuator 19, the amount of the bending or deflection and, consequently, the position of the carrier 14 relative to the base 9 (and optical device 13) can be controlled since the amount of bending is generally proportional to the current supplied to the resistive heater of the bimorphic actuator. Sufficient resistive heating can be generally provided by relatively small amounts of the current, such as 10 mA, thereby reducing the power requirements for the microstructure 19 of this embodiment.

The micro-aligner 10 having the preferred construction described above is able to displace optical fiber 12 greater than 10 microns in any one of the x- or y-directions and displace an optical fiber greater than 100 $\mu$m in the z-direction, at forces of >30 mN in the x- or y-directions and at a force of >100 mN in the z-direction, and a power of <1.0 watt. The movable carrier 14 can have a square or rectangular surface geometry, as indicated in FIG. 1A, although it will be understood that the configuration of the carrier 14 is not limited thereto as long as the above functional requirements are met.

As an exemplary processing scheme for fabricating micro-aligner 10, fabrication of the AFMA chip begins with definition of a PECVD silicon nitride layer 14" (see FIG. 1A) on a silicon wafer, to provide carrier substrate 14, which are later etched via bulk etching to form the cantilever shaped z-axis actuator 19 shown in FIG. 3A and the thinned substrate diaphragm regions 28 of FIG. 2 (by etching recesses into the backside of the carrier 14) at areas below the resistive heaters 26 and thermally actuated arch beam actuators 15 and 16. A low stress PECVD silicon nitride layer patterned on both sides of the silicon wafer is used for this purpose. As is known in the art, the silicon nitride layer forms a base layer which adds strength to the structure as well as a chemical barrier or etch-stop layer.

The surface micromachine layers are then patterned to form the thermal isolation structures and microheaters for the thermally actuated beam actuators 15 and 16. A thick electroplated nickel layer is patterned using the LIGA (German acronym which translates to Lithography, Plating, and Molding) technique. As known to those skilled in the art, LIGA processes are based on a combination of lithography, electroforming and molding. In fact, the acronym LIGA is derived from the German translation of lithography, electroforming and molding, namely, Lithography, Galvanoformung and Abformung. Advantageously, LIGA processes may be used to obtain relatively large height-to-width ratios which permit fabrication with precise tolerances. Thus, this step relies upon synchrotron based deep x-ray lithography.

A key aspect of LIGA patterning is the ability to define high aspect ratio structures, which is crucial for obtaining actuation in the plane of the carrier chip and for defining corresponding spring structures with high in plane compliance. LIGA also permits plating heights which are sufficiently thick to form passive fixturing guides for the fiber, precise edge reference structures, and provides convenient definition of conductor paths for actuator control input. Optical lithography ensures excellent alignment of reference structures with fiber guides and thereby provides assembly alignment accuracy within the capture range of the microactuators.

Following LIGA patterning, the movable portions of the nickel structures are released via sacrificial etching. That is, after forming the nickel structures in the surface of carrier 14 via LIGA, a chemical etch undercuts are provided to selectively release nickel structures from the carrier 14. By properly timing the etch, some nickel structures are completely undercut and, thus, released, while others remain attached to the substrate. In a preferred embodiment of the present invention, fixed structures, e.g., features 3, 3', 18, 21, and 22 in FIG. 1A, remain attached to substrate 14 while other structures such as arches 23 and beams 25, 25' of in-plane microactuators 15 and 16 are released by undercut etching. This result can also be accomplished by using a masked sacrificial layer.

The bulk silicon wafer of substrate 14 is then subjected to anisotropic etching to cut away portions of the substrate underlying where diaphragm 28 is formed (FIG. 2) and thermally relieve the polysilicon heaters 26, using the silicon nitride layer as an etch stop. According to the invention, etching performed on the bottom side of substrate 14 stops at nitride layer 14" which forms the diaphragm 28 on the top surface of substrate 14. Advantageously, this arrangement thermally isolates heater 26 from the other components of micro-aligner 10 and the alignment housing 17. For example, by thermally isolating optical fiber 12 from heater 26, optical fiber 12 may be maintained at a desired temperature to prevent temperature fluctuation from altering or otherwise affecting its alignment. In addition to providing thermal isolation, the etching causes a greater percentage of the heat provided by heater 26 to be transferred to actuator 15 or 16. As a result, actuators 15 and 16 have improved deflection response and efficiency. The resulting process merges surface and bulk silicon micromachining with nickel surface micromachining via the LIGA technique.

The most real estate taken up by the anisotropic bulk micromachining is attributable to making the heaters and relief of the z-actuator. These area requirements can be eliminated by using reactive ion etching (RIE) of the silicon which can achieve through wafer etching with aspect ratios of 40:1. The actuator can require on the order of 1 mm$^2$ of real estate, meaning 1000's of IPMA's per this invention can be formed per wafer surface.

Following wafer level fabrication, the individual devices are separated from each other using conventional dicing, and then they can be packaged, such as in a butterfly type flatpack with the fiberoptic pigtail and the photonic device it is to be aligned with. For instance, the inventive AFMA can be used as an in-package micro-aligner (IPMA) device that directly moves a fiber pigtailing robot from outside to inside the package. The microactuators 15, 16 and 19 (FIG. 1A) can be powered via conventional wirebonding, such that described in U.S. Pat. No. 5,602,955, which teachings are incorporated herein by reference. Furthermore, an optic fiber can be aligned with an optical device, such as a laser diode, using the 3-axis micro-aligner of this invention integrated in a hermetic sealed package prior to or following the hermetic sealing of the package, where the hermetic sealed packages into which the inventive micro-aligners can be integrated include those arrangement described in U.S. Pat. No. 5,602,955, which teachings are incorporated herein by reference.

An advantage of using the inventive AFMA as an in-package micro-aligner (IPMA) is that hybrid components that are now designed to about micron tolerance can now be designed to within about 10 $\mu$m and still be within the 20 micron deflection range, and thus making the packaging less costly. This design is referred to as a mounted design. The mounted design positions the in-plane actuators about the periphery of the fiber holding carrier, which also contains the out-of-plane actuator, as shown in FIG. 1A. This device can be first bonded into a package using standard opto-electronic placement techniques within the actuator range (viz., about 10 $\mu$m). The laser diode of the device can be mounted on the non-moving portion of the silicon substrate using passive LIGA stops to pre-position the laser in front to the fiber. After the actuator is placed into the package, and lensed fiberoptic or other optical component can be brought in and bonded into the fiber holding structure. After the fiberoptic is bonded, the actuator can be actuated to align the fiber to the laser diode.

In any event, the combination of in-plane thermally actuated arch beam actuators 15, 16 with an out-of-plane bimorphic microactuator 19 as formed on a common carrier substrate 14 according to this invention permits the achievement of large forces and displacements through three possible axes of motion effective to overcome not only the biasing means, such as counterforce springs, but also the fiber optic, friction, and wirebond constraints to perform precise in-package alignment of an optical fiber with another optical device. Importantly, according to the invention, micro-aligner 10 does not employ an internally referenced structure such as requiring an alignment frame positioned, or located, on the top surface of substrate 14 to provide an internal reference for micro-aligner 10. The geometry of the inventive microaligner generally brings the optical elements exact alignment within 10 $\mu$m, so the motion of the carrier 14 over 30 microns is adequate to obtain fine alignment. The inventive micro-aligner 10 can be used for either continuous, or for align-and-fix pigtailing. The relatively large stage on which the fiber is attached provides a convenient way to fix the stage, and the fiber, in the aligned position. Since all structures are formed via microlithographic patterning, the accuracy of their placement relative to each other is limited only by accuracy of the photomask patterning tool. The current microlithography equipment can provide better than 0.2 $\mu$m placement accuracy which is more than adequate resolution to accommodate the inventive AFMA approach. Microactuators on the chip act on either an internal fiber support stage or external reference structures defined in the package. In both cases, the actuators must produce sufficient force to overcome the constraints of friction, fiber bending, and the mass of the chip itself. The inventive actuation technology literally pushes the fiber into position to align it with its coupled device and hold it in place during bonding.

Once aligned, the fiber can be bonded by any appropriate technique as long as it preserves the alignment during bonding despite any thermomechanical effects associate with the bonding. The microaligners can be programmed to perform all necessary in-package alignments rapidly and inexpensively, thereby eliminating the current bottleneck in the automated fiber pigtailing process.

Another advantage of the inventive AFMA is that it permits continuous actuation and hybrid opto-electronics that are currently designed to approximately 1 micron tolerance can now be designed to within 10 $\mu$m and still be within the 30 micron deflection range. There two basic designs of the inventive microactuators, which are the mounted and the unmounted designs. The mounted design positions the in-plane actuators about the periphery of the fiberholding carrier, which also contains the out-of-plane actuator. This device can be first bonded into a package using standard opto-electronic placement techniques within the actuator range of approximately 10 $\mu$m. The laser diode can be mounted on the non-moving portion of the silicon substrate using passive LIGA stops to pre-position the laser in front to the fiber. After the actuator is placed into the package, a lensed fiberoptic or other optical component can be brought in and bonded into the fiber holding structure. After the fiberoptic is bonded, the actuator can be actuated to align the fiber to the laser diode.

The unmounted device is relatively smaller due to the fact that all the actuators are on the same silicon base. The lensed fiberoptic or optical component can be bonded to the silicon base at a separating manufacturing station. These are then dropped into their respective alignment cavity in front of the optoelectronic device. If the device is a high power laser requiring a copper heat sink, the alignment cavity can be made using the same LIGA technology used to make the nickel springs and actuators. If a low expansion ceramic material is required, a LIGA mold can be made to make slip cast ceramic alignment cavity.

The inventive IPMA eliminates the need for expensive external automated fiber alignment systems. While the current automated systems are package and device specific and, like any tooling, require different fixtures and tooling to hold packaging and position and bond the coupled fiber. The inventive AFMAs are small devices than can fit into virtually any current package or experimental set-up. The inventive devices eliminate the need for manual alignment procedures by low capitalized companies or researchers, and eliminates the need for high volume manufacturers to purchase many varied external automated fiber alignment systems. Many simultaneous in-package alignments of fiber optic and micro-optic components can be achieved using the inventive microactuators in the package by using a simple desk top computer and array of detectors for control. This significantly reduces the cost of all fiber optically pigtailed components. The inventive AFMA devices could be made smaller than 1×1×0.5 mm$^3$, thus allowing for multiple single mode fiber optic attachments inside standard opto-electronic packages.

As described herein, micro-aligner 10 of the present invention precisely aligns optical fiber 12 with an associated optical device or fiber by controllably varying the deflection of one or both of the arch beam actuators 15 and 16 and/or bimorphic actuator 19. The maximum output power indicates the efficiency with which the optical signals produced by the optical device are coupled to and transmitted via optical fiber 12 and, thus, indicates the alignment's accuracy.

Further, micro-aligner 10 of the present invention is particularly well suited for use in controllably aligning optical fiber 12 with an optical device, such as a laser diode, within a hermetically sealed package such as those packages described in U.S. Pat. No. 5,602,955. Once optical fiber 12 is precisely aligned, the respective positions of optical fiber 12 and its associated optical device are fixed to maintain the precise alignment. Thereafter, micro-aligner 10 remains within the hermetically sealed package which further ensures that optical fiber 12 maintains alignment with the optical device. In the alternative, micro-aligner 10 subsequently re-positions or re-aligns optical fiber 12 as needed to compensate for variations in the optical alignment which occur during use if substrate 14 is not bonded in position relative to base 9 following the initial alignment of optical fiber 12 with the optical device.

In addition to a hermetically sealed package, one or more micro-aligners 10 can be disposed within a fiber optic connector, such as described in commonly assigned U.S. Pat. No. 5,606,635, the contents of the latter of which are expressly incorporated herein in their entirety. In this embodiment, micro-aligners 10 can precisely align optical fibers with respective lens elements of the fiber optic connector in order to collimate the optical signals transmitted therethrough.

In view of the above, it will be, seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A micro-aligner for precisely aligning an optical fiber with an optical device, said micro-aligner comprising:

a stationary alignment housing comprising a base and four sidewalls upstanding from said base defining a rectangular-shaped recess;

a carrier having a surface plane and holding an optical fiber to be positioned in alignment with an optical device, and where said carrier is positioned within said recess defined by the stationary alignment housing;

first and second microactuators provided on the carrier for effecting in-plane alignment of the optical fiber with an optical device in either or both of the two orthogonal in-plane directions in which said in-plane microactuators, when either is activated, exerts a force on a sidewall of said alignment housing sufficient to overcome the normal and opposite biasing force created by first and second respective associated biasing means included on said carrier to cause movement of the carrier in one of the in-plane directions, where said first and second biasing means are provided on opposite sides of said carrier relative to said first and second in-plane microactuators, respectively, with each said biasing means biased against the stationary alignment housing to thereby impose opposing counter forces against which the respective first and second in-plane microactuators on the carrier must act and overcome to cause said in-plane movement of said carrier, and further including first and second backstops located on the carrier in respective association with each of the first and second microactuators, delimiting the amount of return in-plane movement of the associated first or second microactuator after either of the respective first or second microactuator is de-activated;

and a third microactuator provided on the carrier which, when activated, effectively deflects the carrier upward in a direction away from the base.

2. The micro-aligner of claim 1, wherein the carrier includes a semiconductor wafer.

3. The micro-aligner of claim 1, wherein the third microactuator comprises a bimorphic actuator for effecting the out-of-plane alignment of the optical fiber held by the micro-aligner.

4. The micro-aligner of claim 3, wherein said bimorphic actuator having a layer of a first material superposed in contact on the substrate material where said first and substrate materials respond differently to thermal stimuli so that the bimorphic actuator is deflected in a third direction orthogonal to the two in-plane directions by the thermal stimuli and operably deflected away from the base thereby moving the movable platform of the carrier in the third direction.

5. The micro-aligner of claim 1, wherein the carrier includes a optic groove or LIGA channel for receiving the optical fiber and for maintaining the optical fiber in a fixed relation to the carrier.

6. The micro-aligner of claim 1, wherein the optical device is a laser diode.

7. The micro-aligner of claim 1, wherein the optical device is positioned adjacent to one free end of said optical fiber and off the carrier.

8. A method of precisely aligning an optical fiber with an optical device, said comprising the steps of:

providing a micro-aligner comprising:
(i) a stationary alignment housing comprising a base and four sidewalls upstanding from said base defining a rectangular-shaped recess;
(ii) a carrier having a surface plane and holding an optical fiber to be positioned in alignment with an optical device, and where said carrier is positioned within said recess defined by the stationary alignment housing;
(iii) first and second microactuators provided on the carrier for effecting in-plane alignment of the optical fiber with an optical device in either or both of the two orthogonal in-plane directions in which said in-plane microactuators, when either is activated, exerts a force on a sidewall of said alignment housing sufficient to overcome the normal and opposite biasing force created by first and second respective associated biasing means included on said carrier to cause movement of the carrier in one of the in-plane directions, where said first and second biasing means are provided on opposite sides of said carrier relative to said first and second in-plane microactuators, respectively, with each said biasing means biased against the stationary alignment housing to thereby impose opposing counter forces against which the respective first and second in-plane microactuators on the carrier must act and overcome to cause said in-plane movement of said carrier, and further including first and second backstops located on the carrier in respective association with each of the first and second microactuators, delimiting the amount of return in-plane movement of the associated first or second microactuator after either of the respective first or second microactuator is de-activated; and
(iv) a third microactuator provided on the carrier which, when activated, effectively deflects the carrier upward in a direction away from the base;

positioning the optical fiber on the carrier;
holding the optical device in a fixed relation adjacent and off said carrier at a position adjacent a free end of the optical fiber; and
controllably positioning the carrier relative to the optical device by actuating one or more of the first, second, and third microactuators, and precisely aligning the optical fiber with the optical device.

9. The method of claim 8, wherein the optical device is provided by selecting from the group consisting of a laser diode and an optical fiber.

10. The micro-aligner of claim 1, wherein each of said first and second microactuators includes a beam with a first distal end for engaging a sidewall of said alignment housing when the respective first or second microactuator is activated, and an opposite second distal end for engaging one of said first or second backstops when said respective first or second microactuator is de-activated.

11. A micro-aligner for precisely aligning an optical fiber with an optical device, said micro-aligner comprising:

a carrier having a surface plane and holding an optical fiber to be positioned in alignment with an optical device;

first and second microactuators provided on the carrier for effecting in-plane movement and alignment of the optical fiber with an optical device in either or both of two orthogonal in-plane directions when either or both of said in-plane microactuators is activated, wherein each of said first and second microactuators includes a beam having opposite distal ends comprising a first distal end for engaging an adjacent fixed surface when the respective first or second microactuator is activated to induce in-plane movement of the beam towards and until contacting the fixed surface, and an opposite second distal end for engaging one of a first backstop or a second backstop when said respective first or second microactuator is de-activated such that the beam moves in a reverse direction to said in-plane movement, where said first and second backstops are located on the carrier adjacent the second distal end of each respective beam in respective association with each of the first and second microactuators, respectively, such that the first and second backstops delimit the amount of return in-plane movement of the respective beam after either of the respective first or second microactuator is de-activated;

and a third microactuator provided on the carrier which, when activated, effectively deflects the carrier upward in a direction away from the base.

* * * * *